United States Patent [19]

Nakamura et al.

[11] 4,135,218
[45] Jan. 16, 1979

[54] MAGNETIC RECORDING AND REPRODUCING APPARATUS

[75] Inventors: Matsuaki Nakamura; Tatsuji Kitamoto; Yasuo Tamai; Koshu Kurokawa, all of Odawara, Japan

[73] Assignee: Fuji Photo Film Co., Ltd., Minami-ashigara, Japan

[21] Appl. No.: 687,821

[22] Filed: May 19, 1976

[30] Foreign Application Priority Data

May 20, 1975 [JP] Japan ................. 50-59928

[51] Int. Cl.$^2$ ............................ G11B 5/14; G11B 5/12
[52] U.S. Cl. ................................... 360/127; 360/110; 360/125
[58] Field of Search ................ 360/33, 62, 64, 65, 360/84, 106, 15, 31, 25, 125, 127, 110

[56] References Cited

U.S. PATENT DOCUMENTS

| | | | |
|---|---|---|---|
| 3,042,756 | 7/1962 | Buslik | 360/84 |
| 3,303,292 | 2/1967 | Bedell, Jr. et al. | 360/125 |
| 3,352,977 | 11/1967 | Shashoua | 360/84 |
| 3,378,646 | 4/1968 | Shashoua et al. | 360/84 |
| 3,588,378 | 6/1971 | Protzs | 360/84 |
| 3,596,004 | 7/1971 | Procknow | 360/84 |
| 3,651,278 | 3/1972 | Chupiry et al. | 360/125 |
| 3,898,693 | 8/1975 | Chang | 360/84 |

Primary Examiner—Vincent P. Canney
Attorney, Agent, or Firm—Sughrue, Rothwell, Mion, Zinn and Macpeak

[57] ABSTRACT

A magnetic recording and reproducing apparatus provided with a magnetic head device comprising a supporting means having a recording magnetic head made of an alloy system magnetic material and a reproducing magnetic head made of a ferrite system magnetic material. The recording and reproducing heads are fixed relative to one another thereby eliminating the need for completely separate head mechanisms and for complex mechanisms to reliably interchange the positions of the two heads relative to the recording medium.

6 Claims, 7 Drawing Figures

MAGNETIC RECORDING AND REPRODUCING APPARATUS

BACKGROUND OF THE INVENTION

1. Field of the Invention

This invention relates to magnetic recording and reproducing apparatus, and particularly to a magnetic head apparatus for use in high density recording and high efficiency reproduction.

2. Description of the Prior Art

Known types of magnetic head apparatus widely used for magnetic recording and reproducing apparatus, such as video tape recorders or video sheet recorders, include:

(1) A combination system which uses the same magnetic head or heads for both recording and reproducing; and (2) An individual system which uses separate heads for recording and reproducing.

Recently developed magnetic recording media have a characteristic suited for recordings of high density, for example, a high coercive force to prevent a self-demagnetizing action due to the recording of high density and a rapid decrease in reproducing output. The video sensitivity of a magnetic recording medium adaptable for recording at a high density as noted above is predicted by the following equation, as described in the Collection of Dissertations For 5th Science Lecture On Applied Magnetism (Page 76 to Page 77, 9, 1973), Video sensitivity = $0.363$ Bm* + $0.434$ Br* / Bm +
($\lambda = 2.2\mu$)  $1.200$ Hc* − $0.185$ $\Delta$Hc* $\frac{1}{2}$ +
$0.168$ d* + $0.169$ REF* + $0.580$ The mark (*) signifies that the values are those for standard tape converted into decibells.

Bm = Maximum magnetic flux density,
Br = Residual magnetic flux density,
Br/Bm = Squareness ratio,
Hc = Coercive force,
$\Delta$Hc/2 = The half width of the differential curve near at its Hc, which relates to the steepness of slope of B - H curve.
REF = The reflected light intensity (45° to 45°) from the surface of the sample.
d = Thickness of magnetic layer,
$\lambda$ = Recording wave length.

The video sensitivity, from the above equation, increases at the coercive force becomes high, but the magnetic medium requires an intense recording magnetic field, with the result that saturation of the magnetic flux density of the recording system head cannot be ignored. As a consequence, the actual video sensitivity tends to be lower in value than the predicted value obtained from the equation. For example, FIG. 1 shows the relationship between coercive force of a given magnetic recording medium and the video sensitivity for a recording wave length of $2.2\mu$, in which curve A represents the predicted value of sensitivity, curve B represents the actually measured value of sensitivity using an alloy head (Sendust) for recording and reproduction, and curve C represents the actually measured value of sensitivity using a ferrite head (Mn-Zn system ferrite) for recording and reproduction.

The difference between measured sentivity values, resulting from the use of different kinds of heads, is due to the differences in the maximum magnetic flux density. (Bm) and in the physical characteristics inherent in the different materials. Table I below shows the magnetic and physical characteristics of various magnetic head materials.

TABLE 1

MAGNETIC AND PHYSICAL CHARACTERISTICS OF MAGNETIC HEAD MATERIALS

| | ALLOY MATERIAL | | | FERRITE* | | | | | |
|---|---|---|---|---|---|---|---|---|---|
| | Perm-alloy | Alphenol (Alperm) | Sendust(al-pheceil) | high density ferrite | Single crystal ferrite | Hot press ferrite | Hot press ferrite | Conventional sintered ferrite | Unit |
| Composition | Ni 79 Mo 4 Fe 17 | Al 16 Fe 84 | Al 5.5 Si 10.0 Fe 84.5 | NiO 11 ZnO 22 $Fe_2O_3$ 67 | MnO 23 ZnO 7 $Fe_2O_3$ 70 | MnO 15 ZnO 15 $Fe_2O_3$ 70 | NiO 18.9 ZnO 13.6 $Fe_2O_3$ 67.5 | NiO 19 ZnO 13.5 $Fe_2O_3$ 67.5 | Wt % |
| $\mu$o DC | 20,000 | 3,000 | 30,000 | 850 | 2,000 | 2,000 | 250 | 200 | |
| 4MHz | 40 † | 30 † | 60 † | 550 | 1,100* | 800 | 250 | 200 | |
| Bm | 8,700 | 18,000 | 11,000 | 3,900 | 4,500 | 4,000 | 4,000 | 2,500 | gauss |
| Hc | 0.05 | 0.04 | 0.05 | 0.4 | 0.1 | 0.1 | 1 | 1.5 | Oe |
| Specific resistance | $55 \times 10^{-6}$ | $140 \times 10^{-6}$ | $80 \times 10^{-6}$ | $10^7$ | >1 | >$10^2$ | >$10^6$ | $10^7$ | $\Omega$.cm |
| Curie temperature | 460 | 400 | 500 | 125 | 230 | 150 | 350 | 250 | °C |
| Vicker' hardness | 132 | 350 | 500 | 600 | 600 | 650 | 750 | 400 | |
| Density | 8.72 | 6.5 | 8.8 | 5.3 | 5.1 | 5.1 | 5.3 | 4.5 | g/cm$^3$ |

† Sample ring thickness 0.2 mm
*(110) face ring

In video recorders using a combination system magnetic head apparatus the head assembly is often designed with an efficient reproducing system as the main criteria. Consequently, magnetic heads composed of a ferrite system magnetic material are widely used because they provide a high conversion efficiency due to their high permeability, $\mu$o. However, their coercive force is high and their maximum magnetic flux density. is low, resulting in an inability to achieve high density recording. On the other hand, when the magnetic head composed of an alloy system magnetic material is used, high density recording can be achieved but reproduction occurs at a low conversion efficiency because of the low permeability $\mu$o. Consequently there is a distinct disadvantage if the same head is used for recording and reproducing.

In recorders having an individual system magnetic head apparatus the recording system magnetic head apparatus is composed of an alloy system magnetic material and the reproducing system magnetic head apparatus is composed of a ferrite system mangetic material. The recording and reproducing of heads are not mounted on the same mechanism as rigidly with respect to each other. Heretofore, such individual systems have been very complicated, and thus expensive, due to the requirement for precision in video magnetic recording because of the separate mounting. The information tracks must be precisely positioned such that the recording and reproducing head mechanisms place their respective heads in the identical positions relative to the information tracks. This has only been accomplished by complicated adjustment mechanisms.

SUMMARY OF THE INVENTION

It is an object of the present invention to overcome the disadvantages noted above with respect to prior art apparatus.

The object of the present invention may be achieved by providing a magnetic recording and reproducing apparatus characterized by the provision of a magnetic head device wherein the same supporting means supports a recording magnetic head made of an alloy system magnetic material and a reproducing magnetic head made of a ferrite system magnetic material in fixed physical relation to each other.

DESCRIPTION OF THE PREFERRED EMBODIMENTS

Figure 1:
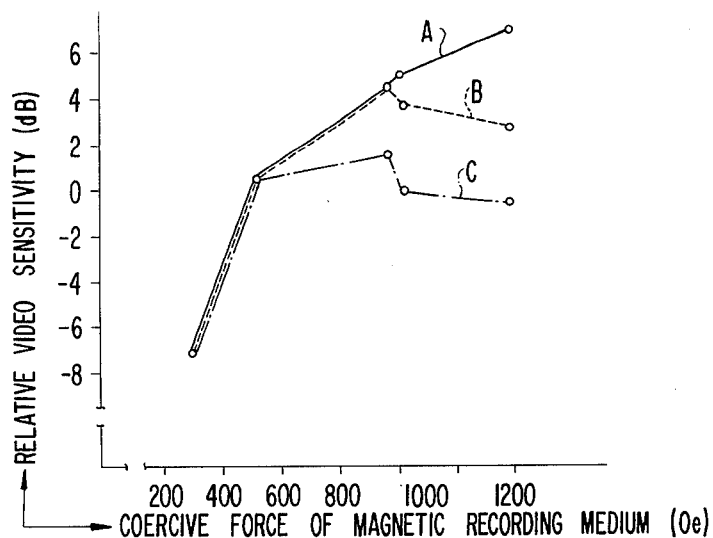
FIG. 1 is a graph showing the relationship between coercive force of a magnetic recording medium and video sensitivity.
Figure 2:
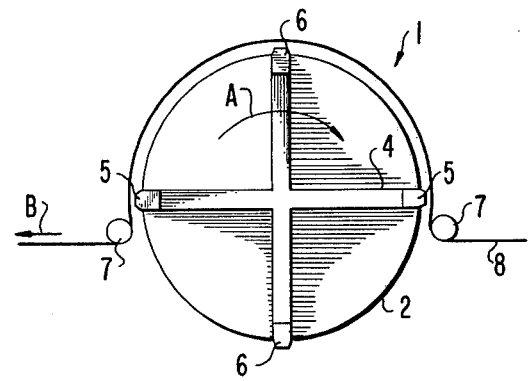
FIG. 2 is a top plan view of a helical scanning rotary head system of a video recorder according to one embodiment of the present invention.
Figure 3:
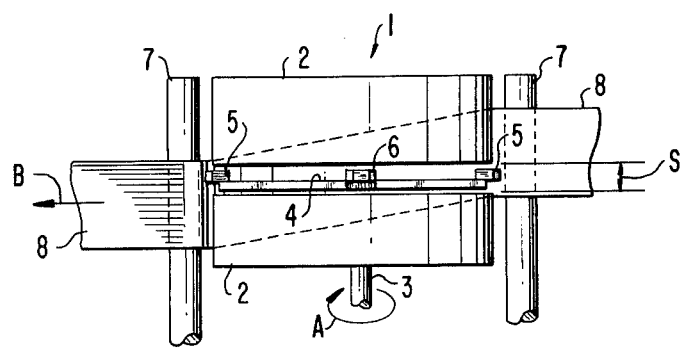
FIG. 3 is a front view of FIG. 2.

Turning now to FIGS. 2 and 3, there is shown a rotary head device 1, which comprises, two drums 2 disposed one above the other to form a horizontal slit S therebetween, a cross arm 4 rotatable in the direction of the arrow A by means of a rotary shaft 3 extending through the central portion of the drums 2, and two recording magnetic heads 5 and two reproducing magnetic heads 6, said recording and reproducing magnetic heads being mounted on the upper surfaces at the tips of the arm 4.

The recording magnetic heads 5 are made of an alloy system magnetic material, for example, such as a Sendust system or alphenol system alloy material, and the reproducing magnetic heads 6 are made of a ferrite system magnetic material, for example, such as single crystal ferrite or high density ferrite. Further, the aforesaid recording magnetic heads 5 can be thin film magnetic heads which are made of the alloy system magnetic material described above, a conductor such as Cu and an insulator such as SiO, by using several techniques such as electroplating, vacuum evaporating, cathod sputtering, photo etching and the like as disclosed in the Journal of IEEE Transations on Magnetics, vol. Mag-11, No. 5,1218, September 1975.

The slit S is designed to have the minimum width necessary to accomodate the arm 4 provided with the recording magnetic heads 5 and reproducing magnetic heads 6. The foremost surfaces of the recording magnetic heads 5 and reproducing magnetic heads 6 mounted on the arm 4 are each slightly extended past the outer surface of the drums 2 and are alternately arranged on the same circumference in a spaced relation of 90° from the center of the arm 4. Guide rollers 7 are provided on the opposite sides of the drums 2 so that a magnetic tape 8 may travel in the direction of the arrow B while being helically wound around substantially half the circumference of the drum 2.

To record video signals, the magnetic tape 8 is caused to travel at a constant speed in the direction of the arrow B while being wound in helical fashion around more than half of the circumference of the drums 2 and the slit S. The arm 4 is rotated at a constant speed in the direction of the arrow A and at the same time the two recording magnetic heads 5 disposed in a spaced relation of 180 degrees from the center of the arm 4 are excited to magnetically record video signals on the magnetic tape 8.

The magnetic tape 8, to which a high coercive force must be imparted for purposes of recording the video signals thereon with high density can have the signals recorded thereon by the recording heads 5 which will not saturate because of their high maximum magnetic flux density Bm.

Next, in reproducing the video signals, the magnetic tape 8 travels and the arm 4 is rotated in a manner similarly to that for video recording, as previously mentioned, and at the same time, the two reproducing magnetic heads 6 are excited to reproduce the video signals magnetically recorded on the magnetic tape 8. It will be appreciated that in order that the reproducing magnetic heads 6 accurately trace a recorded track when the magnetic heads are switched from the recording system to the reproducing system, a 90° phase shifter added to a known servo circuit for a rotary head device can be used to control the phase of the servo system.

Figure 5:
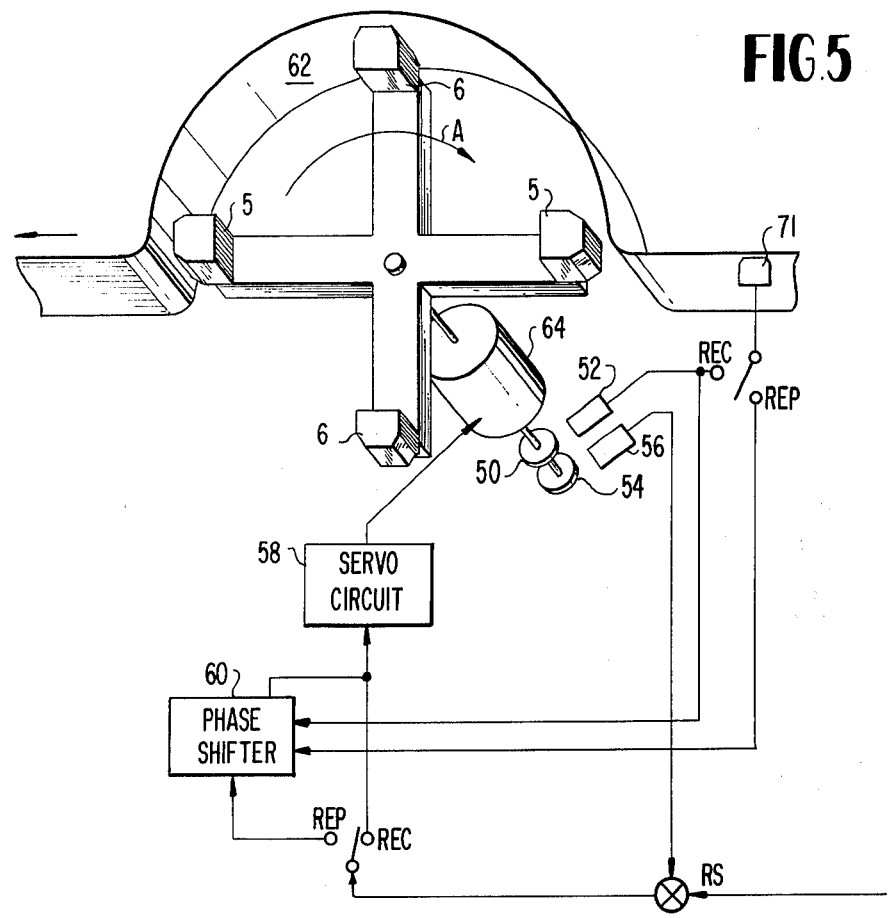
FIG. 5 is a diagram of a control system for controlling the rotary position of the magnetic heads.

A well-known servo system for a turn head apparatus is shown generally in FIG. 5 with the addition of a phase shifter 60. For the head according to the present invention, the phase shifter 60 is switched into the circuit during the reproducing mode.

When recording, a standard turn speed reference signal (RS) is applied to a servo circuit 58, which drives a motor 64 in the direction of arrow A at a speed based on RS. The motor rotates the recording heads 5 and the reproducing heads 6, which are turned with a direction of the arrow A.

Figure 6:
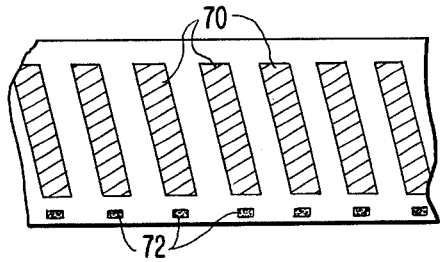
FIG. 6 is a pictorial representation showing the relative positions of the information signals and the control track signals on a magnetic medium.

The turning speed of the motor or heads 5 is detected by a conventional encoder comprising disc 54 and detector 56. The detected speed is fed back for combination with RS to correct the difference between RS and the rotational speed. Also, the output signal from a pulse generator, comprising disc 50 and detector 52, constitutes the control track pulse and occurs twice each revolution in accordance with the phase of the heads 5. The control track signal is recorded on the lower part of the tape by means of the control truck head 71. As seen in FIG. 6, the information signal, recorded by means of the heads 5 is recorded in tracks 70 and the control track signals are recorded at 72.

When the system is switched to the reproducing mode, the RS signal is supplied to the servo circuit 58 via the phase shifter 60. Also the output signal of the encoder is fed back for combination with RS in order to correct the difference. At the same time, the recorded control track signal is reproduced, by means of the control track head 71, and applied to the phase shifter 60 along with the output signal of the control track pulse generator. The time difference between the two pulse signals is detected and the speed control signal is phase shifted to cause said two pulse signals to be 90° out of phase. This results in the reproducing heads 6 being in phase with the information tracks 70.

Accordingly, the phase of heads 5 is delayed by 90° from the control track signal recorded on the tape. The phase of reproducing heads 6 is delayed by 90° from the phase of heads 5 and is turned in accordance with the control track signal.

Since the reproducing magnetic heads 6 have an extremely high permeability $\mu o$, the system has a electromagnetic conversion effeciency and exhibits a high SN ratio in the output.

Figure 4:
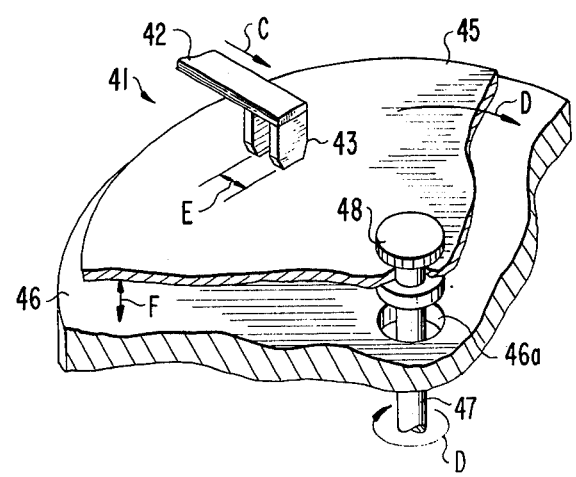
FIG. 4 is a perspective view partially cutaway of a magnetic sheet recorder according to a modified embodiment of the present invention.

FIG. 4 illustrates a modified form of embodiment according to the present invention, which is a video sheet recorder.

A magnetic head device as indicated at 41 comprises an arm 42 movable toward the center of a magnetic sheet 45, a recording magnetic head 43 mounted on the under-surface of the arm 42 and made of an alloy system material, for example, such as Sendust system or alphenol system material, and a reproducing magnetic head 44 also mounted on the undersurface of the arm 42 and made of a ferrite system magnetic material, for example, such as single crystal ferrite or high density ferrite material. The recording magnetic head 43 and reproducing magnetic head 44 mounted adjacent to each other on the under-surface of the arm 42 are disposed along the rotating direction D of the magnetic sheet 45 and in parallel to each other in a suitable spaced relation, E.

The reference numeral 46 denotes a base plate of the magnetic sheet recorder, and numeral 47 denotes a rotary shaft extending through a central hole 46a of the base plate 46. The shaft 47 is rotated in the direction of the arrow D with a central portion of the magnetic sheet 45 held by the upper end surface of shaft 47 and a screw 48.

When the magnetic sheet 45 mounted on the rotary shaft 47 is rotated in the direction of the arrow D, it floats on an air cushion. Thus there is a slight clearance F between the upper surface of the base plate 46 and the magnetic sheet 45. As the sheet 45 rotates, the magnetic surface of the sheet comes into accession or contact with the foremost surfaces of the recording magnetic head 43 and reproducing magnetic head 44.

The recording magnetic head 43 is excited and the arm 42 is moved in the direction of the arrow C to record video signals on the magnetic sheet 45. For reproduction the reproducing magnetic head 44 is excited and allowed to trace the recorded track.

It is noted that since the reproducing magnetic head 44 is displaced by an amount E from the recording magnetic head 43, an arrangement is made so that such a displacement may be corrected prior to commencement of reproduction by the arm 42.

Figure 7:
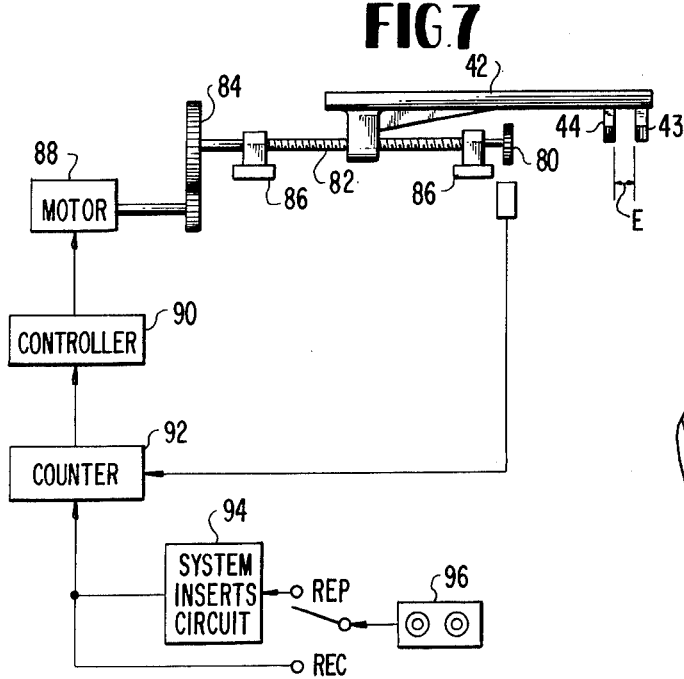
FIG. 7 is a diagram of apparatus for controlling the lateral position of the magnetic heads.

An example of a system for providing the correction is shown in FIG. 7. Although only arm 42 is illustrated it will be apparent that the other three arms are adjusted by the same mechanism shown. An input command circuit 96, for setting the exact position of record head 43, applies a command signal via preset counter 92 to a controller 90. The controller 90 controls motor 88, which turns gear 84, which rotates ball screw 82 relative to bearings 86. Arm 42 thereby moves in accordance with the command in counter 92. A coded disc attached to the ball screw and a detector make up an encoder 80, which feeds position signals to the counter 92. Movement stops when the head 43 is at the position determined by the input command signal from circuit 96. During the reproduction mode the system inserts circuit 94, which add an amount, $+E$, to the command signal. Consequently the reproducing head will be positioned exactly adjacent the recorded track.

Thus the invention disclosed above permits the advantages of an individual system without the normally attendant complex mechanisms for interchanging the record and reproduce head mechanisms. This is accomplished by providing at least one record head and at least one read head, fixedly positioned relative to one another on the same head supporting mechanism, the record head having a maximum magnetic flux density Bm substantially higher than that of said read head, and said read head having a permeability $\mu o$ substantially higher than that of said record head.

What is claimed is:

1. Apparatus for recording, with high density, and reproducing signals on a magnetic medium, comprising, at least one magnetic recording head and at least one magnetic reproducing head fixedly positioned relative to each other in an orthogonal relationship on a common head support mechanism, said recording head constructed of a first material selected from the group consisting of permalloy, alphenol and sendust and said reproducing head constructed of a second material selected from the group consisting of high density ferrite, single crystal ferrite, hot press ferrite and conventional ferrite providing said recording head with a substantially higher maximum magnetic flux density Bm and a substantially lower permeability $\mu o$ at high frequencies than those of said reproducing head.

2. Apparatus as claimed in claim 1 wherein said first material is selected from the group consisting of permalloy, alphenol and sendust and wherein said second material is selected from the group consisting of high density ferrite, single crystal ferrite, hot press ferrite and conventional ferrite.

3. Apparatus as claimed in claim 1 wherein said support mechanism comprises a rotatable cross arm having four extremities defining the points of 0°, 90°, 180° and 270° of a circle, said at least one magnetic recording head comprising two magnetic recording heads fixedly positioned at the 0° and 180° extremities, said at least one magnetic reproducing head comprising two magnetic reproducing heads fixedly positioned at the 90° and 270° extremities.

4. Apparatus as claimed in claim 3 further comprising means for rotating said cross arm to cause said recording and reproducing heads to have the locus of a single circumference of a circle, first and second drums having equal circumferences which are approximately the same as said locus circumference, said first and second drums being postioned to provide a space therebetween wherein said cross arm rotates, and means helically winding a magnetic tape slightly more than half way around the combination of said drums and space to cause said heads to trace an angular track across said tape, and electronic servo and synchronizing means for positioning said recording heads and reproducing heads at the identical positions of one another relative to said tape during recording and reproducing, respectively.

5. Apparatus as claimed in claim 1 wherein said support mechanism comprises an arm means, said magnetic recording and reproducing heads being fixedly positioned on said arm separated by a space E, a rotatable shaft having disc holding means thereon for holding and rotating a magnetic recording disc, said arm and said rotatable shaft being controllably positioned relative to one another so that circumferential tracks on said disc are brought into magnetic recording and reproducing access of said magnetic recording and reproducing heads.

6. Apparatus as claimed in claim 5 further comprising electronic control means selectably actuable into a recording mode and a reproducing mode for laterally positioning said recording and reproducing heads to have identical positions relative to said disc tracks during recording and reproducing, respectively.

* * * * *